United States Patent
Kerouac

[19]

[11] Patent Number: 6,071,740
[45] Date of Patent: Jun. 6, 2000

[54] VESSEL COMPOSTING PROCESS AND APPARATUS

[76] Inventor: Paul E. Kerouac, PTL Way, Hollis, N.H. 03049

[21] Appl. No.: 09/398,573

[22] Filed: Sep. 17, 1999

Related U.S. Application Data

[60] Provisional application No. 60/100,932, Sep. 18, 1998, and provisional application No. 60/115,736, Jan. 12, 1999.

[51] Int. Cl.[7] .................................................. C12M 3/00
[52] U.S. Cl. ................................ 435/290.3; 435/290.4
[58] Field of Search ............................. 435/290.1, 290.3, 435/290.4

[56] References Cited

U.S. PATENT DOCUMENTS

| | | |
|---|---|---|
| 2,127,137 | 8/1938 | Price . |
| 2,297,804 | 10/1942 | Siegfried . |
| 3,220,804 | 11/1965 | Bachmann et al. . |
| 3,245,759 | 4/1966 | Eweson . |
| 5,028,398 | 7/1991 | Hallberg et al. ........................ 422/189 |
| 5,047,349 | 9/1991 | Eweson .................................. 435/312 |
| 5,407,809 | 4/1995 | Finn ........................................ 435/41 |
| 5,591,635 | 1/1997 | Young et al. ......................... 435/286.1 |
| 5,605,834 | 2/1997 | Eberthson et al. ................... 435/290.3 |
| 5,661,031 | 8/1997 | Murphy et al. ....................... 435/290.3 |
| 5,766,935 | 6/1998 | Seagren ................................ 435/290.2 |

OTHER PUBLICATIONS

Green Mountain Technologies, The Earth Tub: A Commercial Duty Compost System (4 page brochure).

*Primary Examiner*—David A. Redding
*Attorney, Agent, or Firm*—Vernon C. Maine; Scott J. Asmus

[57] ABSTRACT

An in-vessel composting apparatus for processing food waste and associated organic packaging materials, consisting of a shredder/particle size, and a horizontal drum with three chambers with connecting ports of sequentially increasing diameter, incremental drum rotation, and process control system.

20 Claims, 5 Drawing Sheets

VESSEL COMPOSTING PROCESS AND APPARATUS

This application claims priority to pending U.S. applications Ser. No. 60/100,932, filed Sep. 18, 1998, and Ser. No. 60/115,736, filed Jan. 12, 1999.

BACKGROUND OF THE INVENTION

1. Technical Field of the Invention

This invention relates to reduction and contained decomposition of organic waste material, and more particularly, to a unitized process and apparatus for reducing and in-vessel composting raw food waste and biodegradable eating utensils and trays, yard waste, and newspapers, in combination with associated organic packing materials such as cardboard and paperboard containers.

2. Background Art

According to published sources, in all, the United States generates approximately 208 million tons of municipal solid waste per year. Public and private sectors, alike, are facing increasing cost and difficulty in disposing of their enormous and increasing tonnage of solid waste and garbage in an environmentally sound and economically acceptable manner. Historically, refuse or garbage has been collected and disposed of by one of several inexpensive means, such as open burning, dumping in waterways, or dumping in common landfills.

As the ecological impact of such practices became evident, the demand for safer practices grew. Three methods emerged as environmentally sutiable means for safe refuse disposal: (1) sophisticated landfills with costly structures and controls designed to prevent leaching into surrounding ground water; (2) controlled incineration; and (3) composting in which the compost product has a reduced toxicity suitable for subsequent disposal in a landfill. However, according to data from the United States Environmental Protection Agency, the number of operating landfills in the U.S. has dropped by more than half in the past ten years.

Although municipal incinerators are more environmentally friendly than they were a generation ago, they continue to release gases and solid particles that may harm human health, damage property, and kill plants. The biggest components of all municipal solid waste are compostable; yard waste, corrugated boxes, and food waste.

The benefits of composting have long been known. Though not a fertilizer, it is a useful soil conditioner that improves texture, air circulation, and drainage. Compost moderates soil temperature, enhances nutrient and water-holding capacity, decreases erosion, inhibits weed growth, and suppresses some plant pathogens. High quality compost is being used for and marketed as a soil amendment and as mulch for landscaping, farming, horticulture, and home gardens. Compost can also be used as landfill cover or in land reclamation projects.

There is a large body of art relating to in-vessel composting, some providing useful descriptions of the basic biological process. Existing in-vessel composters typically have one or more of the following general short-comings. (1) the system is too complex and the cost to purchase and operate is cost prohibitive to small businesses and organizations, (2) the system requires an extended processing time of generally greater than three weeks, such that the necessary capacity of the system becomes cumbersome and/or restrictive, or (3) the process produces output material which is less than 60% composted when removed from the vessel, requiring additional composting and processing time prior to curing.

There remains a need for an affordable, simple to operate, energy efficient, in-vessel composting system that substantially reduces the volume and weight of the input materials, and processes a useful end product of commerical value.

SUMMARY OF THE INVENTION

Disease-suppressive compost is not made by accident. It comes about by carefully monitoring the atmosphere inside of a composting vessel to ensure that the temperature, moisture, and oxygen levels are all maintained at proper levels throughout the entire process. Varying species of bacteria present in the composting vessel will break down and organic materials into the output compost mixture. And, as temperatures rise and fall in the compost, different bacterial species will become more or less active. Psychrophilic bacteria, mosophilic bacteria and thermophilic bacteria each operate best within specific temperature ranges. Furthermore, with sufficient oxygen, microorganisms produce energy, grow quickly, consume more material and make nutrients available for plant growth. Without exygen, aeobic bacteria die off and anaerobic bacteria take over. They will break down the material, but more slowly, and with an accompanying unpleasant odor. Offensive odors are produced only when the material in the system is allowed to become anaerobic, not a normal condition in the practice of this invention.

To provide a simple, reliable, effecient, in-vessel composting system, it is most useful to optimize the apparatus to a selected, well-defined waste stream, thus reducing the processing variables and simplifying the apparatus and operation. This technique offers the user a composting process and apparatus that produces a more consistant, higher quality, nutrient rich, end product.

The invention, in it's simplest form, is an integrated or unitized reduction and composting process and system for the recycling of food waste and associated organic waste materials such as cardboard and paper board packaging materials, into a bulk end product that is manageable, useful, and inoffensive. This waste stream provides an abundancy of nitrogen and moisture, both imporant in the process. The amount of carbon and moisture absorbing bulk input can be varied, based on process conditions, by adding supplemental organic materials such as cardboard and paper board. The invention will accept traditional bulking agents such as sawdust and wood chips if desired, but is specifically designed to shred corrugated cardboard, found in many waste streams such as that of restaurants and supermarkets, to optimum size for the composting process of the invention.

The system is tolerant of a limited amount of incompatible solid contaminants that may be present in particular applications or installations. The invention utilizes a continuous four-step process which has approximately a three week throughput cycle, consisting of shredding to the optimal particle size, then mixing and composting through a three step, in-vessel process. The apparatus is self-contained to provide for continuous input of raw waste, generating a bulk output of nutrient-rich, organic bulk compost material of significantly less volume and weight than the input materials.

Particle size is an important aspect of the composting process. If the waste particles are too large, the relatively small ratio of surface area to mass inhibits the start of the process. Shredding the material at the point of input offers a large advantedge in this respect. On the other hand, if the input material is shred too small, porosity and the ability of the material to be aerated is greatly diminished. As a result, bacteria is less able to act. For the waste stream to which this invention is directed, an optimal particle size has been determined to be about 3 cubic inches. A shreder in the infeed stage provides for this requirement After the shredder sizes the input material, the material is directed into the first chamber of a three-chambered rotating drum. While three different drums would offer some flexibility in the control of the process, one drum and drum drive provides the necessary efficiency in design that is reflected in cost and simplicity. The drum is encased in an insulated enclosure, assuring that there will always be a surplus of heat The drum is arranged on a base frame to be horizonal, and not inclined in any manner, again contributing to the simpliest overall apparatus.

Periodic and temperature-based drum rotation, in conduction with the periodic operation of an exhaust fan for air exchange, provides necessary cooling control. Oxygen, present in the specified waste stream materials and moisture content, and in the makeup air supplied by the exhaust fan ,is present at adequate levels to sustain the composting process. Aeration for drying, cooling, and supplying oxygen, is accomplished by the incremental rotations of the drum throughout the process.

Chamber to chamber progression is intentionally restricted to gradual, full diameter tumbling of the materials in each chamber, with a continual incremental spill over through a slightly larger diameter annualar, axial port into the next chamber. The continuous spill over into the next chamber permits the remaining material to maintain a small but consistant forward progression through the drum as it tumbles, without inconsistant acceleration of portions of the material by intentionally angled blades, buckets or augers. This assures that the process progresses at a consistent rate in each chamber, and that the end product will be a homogenous, fully composted end product. A substantial residual volume of material is retained in all chambers at all times, further forward movement through the system and discharge of end product being dependent on regular, continuing input at the infeeding end.

Once inside the first chamber, the material will reside there for approximately 2 to 5 days as it is slowly churned into a homogeneous mixture, and the new material is engulfed in the composting process. A small mixing vane or like feature promotes tumbling, but does not contribute directly to forward movement through the system. Heat is readily generated by the active thermophilic bacteria, supplied with nitrogen and carbon, both inherently present in the mixture. The material is advanced to the next chamber as described above.

The center or second chamber is the main composting furnace. Having be pre-conditioned in the first chamber, the new material is quickly filly absorbed in the process. The temperature within this second chamber is maintained within the range of 100 to 150 degrees Fahrenheit, preferably higher than 131 degrees Fahrenheit to ensure pathogen destruction if the waste food mix includes meats. It is also necessary to maintain this temperature range to kill any seeds present within the waste stream. In contrast, from practice it was found that waste stream materials other than those containing pathogens, such as fruits, vegetables, paper, etc. will degrade to compost at temperatures as low as 95 degrees Fahrenheit due to the activity of mesophilic bacteria.

However, it should be noted that while there are no pathogenic materials to contend with, seeds within the waste stream will not be killed at such a low temperature. Just as important, the temperature of the mixture material should not exceed 150 degrees Fahrenheit as the anerobic bacteria will begin to die off as temperatures rise above this level.

The volume of the second chamber is such that during continuous use and operation of the system, the bulk of the mixture is retained for approximately 4 to 10 days while the composting action reduces the volume of the output mixture by typically as much as 85 to 90 percent. As a result of this decrease in volume, the density of the material is increased.

A limited internal structure, as in the first chamber, promotes tumbling only. A small amount of mixture is being passed into the third chamber, again by the incremental rotation and gradual flow through the next larger port. A substantial amount of residual material remains working in the second section at all times when input is less than capacity.

By the time the material reaches the third chamber, its volume has been greatly reduced due to the composting process. Due to the reduction of the material within the first two chambers, material flows into the third chamber at a much slower rate. The material, therefore, is not as quickly displaced from the third chamber. As a result, material resides in the third chamber for a longer duration, allowing the material to finalize the composting process and begin to cure. This chamber is equipped with a greater number of vanes or equivalent structures to increase tumbling and to reduce and break up any clumps in the compost material received from the second chamber.

In practice, even with less than ideal peak temperatures through the first and second chambers, seedling vegetation growth has been witnessed in the third chamber material. This is noteworthy because vegetation is unable to grow in active, unfinished compost material. This demonstrates that the resultant material in the third chamber has completed the composting process and is partially cured prior to exiting through the third chamber's output port.

It is an object of the invention to provide an apparatus for the efficient, in-vessel composting of foot waste and associated organic waste such as cardboard and paperboard packaging materials.

Still other objects and advantages of the present invention will become readily apparent to those skilled in this art from the following detailed description, wherein I have shown and described only a preferred embodiment of the invention, simply by way of illustration of the best mode contemplated by me on carrying out my invention.

DESCRIPTION OF THE PREFERRED EMBODIMENT

The invention is susceptible to many variations, including scaling for capacity, in so long as process parameters and control logic are maintained. Accordingly, the drawings and following description of the preferred embodiment are to be regarded as illustrative in nature, and not as restrictive.

The invention is capable of scaling, so long as the integrity of the process is maintained. Process constraints include particle size, relatively significant retention quantities and dwell time in each chamber, sufficient air changes and ariation, and temperature control. Apparatus variables to be considered are the incremental amount and frequency of drum rotations required to control the heat, in combination with size and ratio of chamber length to drum diameter, and the port sizes. The preferred embodiment is intended to handle an input volume waste stream of up to one ton per day, or about seven tons per week.

The four principal components of the apparatus of the preferred embodiment consist of an infeed section, a drum section, a closed compost container, and a process control system. The infeed section, drum section and process control system are mounted on a base frame and suitably enclosed and insulated to operate as a unitary composting system. The closed compost container is mated to the back of the drum to receive and collect the system outflow, but is free standing so as to be convenient for periodic emptying or exchange when full. The enclosure is substantially closed to drafts, but is not pressure proof, natural outgassing occuring by design in the area of the back end and compost container, and forced ventilation drawing fresh air in through the same vents.

The infeed section has a feed hopper and lid, a material shredder/particle sizer powered by an electric moter, and an infeed auger likewise powered by an electric motor. The drum section consists of a large, horizontally oriented, three chamber drum, mounted on the base frame so as to be rotable by a motorized drum drive system. The chambers are divided by substanially planar partitions, perpendicular to the axis of the drum. The drum has a relatively small axial port at the front end, and successively slightly larger axial openings or ports in the interior partitions and in the back end wall.

The materials path is into the hopper, through the shredder/particle sizer, through the auger into the first chamber, and successively through the second chamber, the third chamber, and into the compost container. The drum is horizontally mounted on the base frame. The graduated sizes of the axial ports provides for a retained volume of working materials in each section, and a gradual spillover of excess amounts into the next successive chamber and then into the compost container. In operation, as the drum is rotated in successive, incremental amounts, the material tumbles around the inside diameter of each chamber several times and gradually advances to the next port.

The process control system consists of an operator's station, process controller and process sensors including a temperature sensor and an optional oxygen or carbon dioxide level sensor. The controller also receives inputs from the operator switch and various safety switches. The controller output controls the shredder motor, the auger motor, the drum drive system, and an exhaust fan air changing system equipped with a biofilter to assure non-oderous emissions.

The exhaust fan duct is connected at the front end of the system so as to exhaust interior air and draw makeup air in from the back end.

The optional oxygen or carbon dioxide sensor is located in the airflow path to the exhaust fan. The temperature sensor is located at the base of the drum in the area of the center chamber. The temperature sensor assembly alternately bears on the exterior wall of the center chamber of the drum when it is not rotating, and is lifted clear by a cam linked to the drum drive system when the drum is rotating. The sensor is located at point rotationally forward of bottom dead center where the general center of mass of contained material is concentrated by the rotating action of the drum. At this location, the sensor provides an indication of the temperature of the material at the height of its exothermic process, when the drum is stationary, and measures the ambient air temperature when the drum is in motion. The operator's station is provided with a temperature readout and/or high and low temperature indicator lights, and with oxygen or carbon dioxide level readouts if either sensor is installed.

To conduct a periodic loading of materials into the apparatus, assumed to be as often as several times a week, the operator opens the hopper, which automatically starts the exhaust fan to prevent outflow of fumes through the hopper, and loads it with waste material, and closes the lid. The operating switch is then engaged to start the shredder and auger and a process cycle of incremental rotation and exhaust fan operation. When the hopper is empty, the shredder is disengaged.

The shredder reduces the material into particles of not more than one by one by three inches, the maximum size calculated to facilitate effecient and complete composting in accordance with the process and apparatus of the invention. Particles larger than about four cubic inches begin to reduce the speed and effectiveness of the bacterial action in the first chamber. Smaller is better.

Disengaging the operator switch turns off the shredder and the auger, and initiates a standard process cycle of drum rotation and exhaust fan operation, conducted by the controller and based on process conditions and predetermined or programmable times and process limits.

It has been found useful to add about one to three yards of a starter batch or resident compost to each of the first two chambers, to facility a quick startup of the process. The specified input materials for which the invention is intended, normally contain a suffient amount of moisture, nitrogen and the required bacteria to maintain the composting process within the drum section as the working volumes in each chamber are accumulated and the excess is advanced to the next chamber. The process is exothermic and requires mainly only oxygen to be sustained to completion. The enclosure is well-insulated, so the primary requirement of the apparatus is to remove excess $CO_2$, $H_2O$ (water vapor), and control the heat, and add sufficient makeup air to supply the oxygen needed in order to sustain the process.

The first chamber serves to mix the shredded materials into an homogenous mixture, stabilize the temperature and moisture content, and allow the composting process to engage the new material. It has a single, straight vane running lengthwise on the drum wall, parallel to the axis of rotation, which imparts tumbling action to the materials, but only once every complete rotation or once in three process cycles.

The second, largest chamber accepts the prepared material into a dedicated composting chamber, relatively isolated and insolated by the first and third chambers from exterior factors, where the bulk of the composting takes place, and likewise has a single mixing vane to assure tumbling of the materials. The third chamber is a smaller, final holding station that provides additional time for mixing, drying and cooling of the composted, final product of uniform consistancy, and a steady rate of outflow to the compost container. The third chamber has three, equally spaced mixing vanes to maximize tumbling of the materials at this stage.

The main purpose of the vanes in the first and second chambers is to promote and ensure tumbling within these drum sections, not for the forward progression of the material from one chamber to the next. As found in practice, any forward-inducing spiral or angle in these vanes will cause the composting material to progress through the drum too quickly, causing the material to traverse the three chambers and be discharged prior to fully completing the composting process.

Moisture is generally overabundent in the materials for which the apparatus is specified. Excessive moisture content in the materials, more than 60–65%, can inhibit the process and is reflected in reduced temperature in the working material. However, supplement bulk material, mainly in the form of cardboard and other biodegradable packaging materials, is readily available to prospective users of the apparatus to absorb and balance the excessive moisture content of the primary materials if needed.

Assuming ambient outside air as a starting medium and makeup medium, increasing carbon dioxide levels in the drum will indicate consumption of oxygen. When the level of $CO_2$ goes high, it can be assumed that there is not sufficient remaining oxygen to sustain the process at an effecient rate, and an air change is required. However, it should be noted that the specified input materials, and the operation of the apparatus as described here, can be expected to provide sufficient oxygen under all but extreme circumstances.

The controller is programmed to periodically execute a process cycle of limited drum rotation, a range of ¼ to ½ turn being adequate, with ⅓ turn being that of the preferred embodiment, which is calculated to be sufficient to roll and turn the materials in each chamber to expose a new layer to the available oxygen, and to advance any excess towards the next downstream port. The stationary time or period between automatic rotation is calculated to permit the composting process to progress with the available oxygen, retaining most of the heat generated and outgassing at the rate of generated, at the back end of the apparatus. The period of repetition for the preferred embodiment is every three hours, but will likely be superceded by on-demand provisions for additional rotation and make-up air based on exceeding the high temperature limits.

The rotation cycle also includes concurrent operation of the exhaust fan with for air circulation in the drum. The flow rate of the fan and duration of operation as relates to the drum rotation, assures adequate air exchange and arration consistant with the progress of the process. For the preferred embodiment, the fan on time is the same as incremental drum rotation time, about 7–10 seconds.

The preferred materials temperature, $T_M$, operating range is between 130 and 150 degrees Fahrenheit. The materials temperature is being monitored through the wall of the drum whenever the drum is not rotating. Whenever the materials temperature $T_M$ is interpreted as exceeding 150 degrees Fahrenheit, beyond which the survival of beneficial bacteria is affected, a standard process cycle of ⅓ turn drum rotation and exhaust fan operation are automatically commenced by the controller, after which the materials temperature is again reinitiated. More frequent drum rotation turns the material more often, causing a decrease in the materials temperature through greater convective and radiated heat transfer to the interior air, and the attendent air change produced by operation of the exhaust fan.

When materials temperature $T_M$ falls below 130 degrees Fahrenheit, as indicated at the operator's station, all else being in order, the process is presumed to be inhibited by the presence of too much water. Under these conditions, the operator is trained to add more bulk, such as cardboard or sawdust, to the input materials to reduce the relative amount of water.

Figure 1:
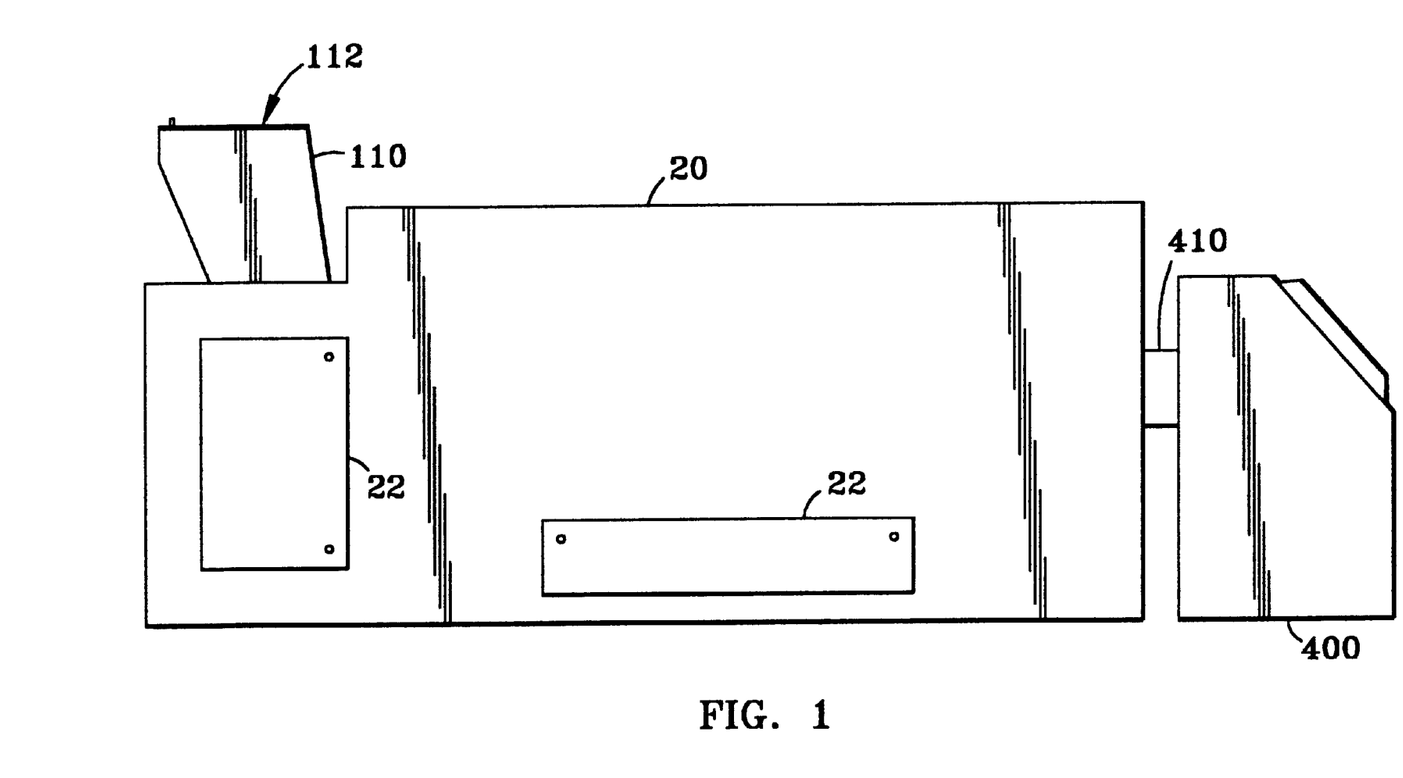
FIG. 1 is a side elevation of the preferred embodiment, showing the front end and hopper, the system enclosure, and the recovered materials compost container at the back end.
Figure 2:
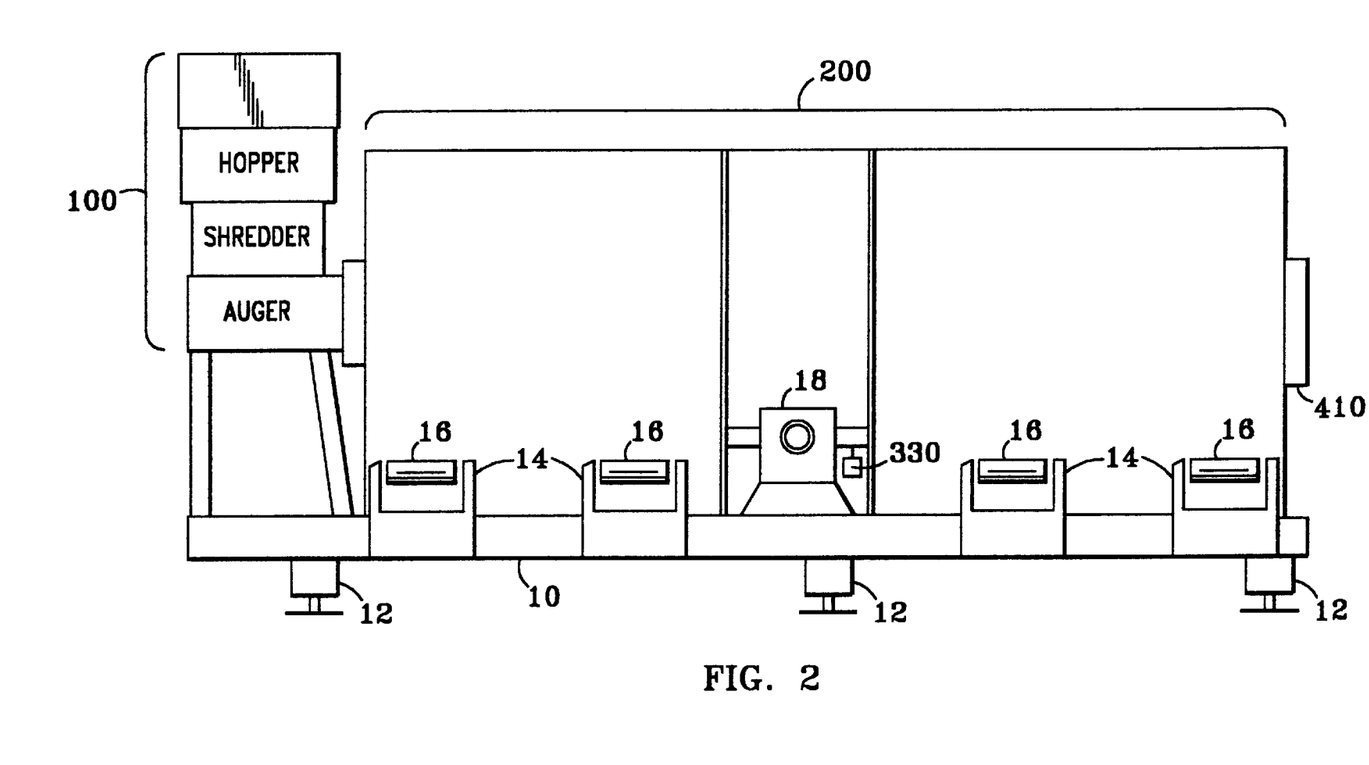
FIG. 2 is a diagramatic side elevation of the embodiment of FIG. 1, showing the hopper, shredder, feed auger, three chamber drum with support and drive mechanism, all mounted on a base frame.

Referring now to FIGS. 1 and 2, there is illustrated an infeed section 100, drum section 200, process control system 300, and closed compost container 400. The infeed section, drum section and process control system are mounted on base frame 10, which is leveled by adjustable legs 12, and suitably enclosed and insulated by enclosure 20 to operate as a unitary composting system. Access panels 22 provide access for maintenance purposes. The closed compost container 400 is closely coupled to the back end of drum section 200, while providing limited venting capability at the point of coupling 410. Enclosure 20 is substantially closed to drafts, but is not necessarily pressure proof, natural outgassing occuring by design in the venting noted at coupling 410 when the exhaust fan is not running.

Figure 3:
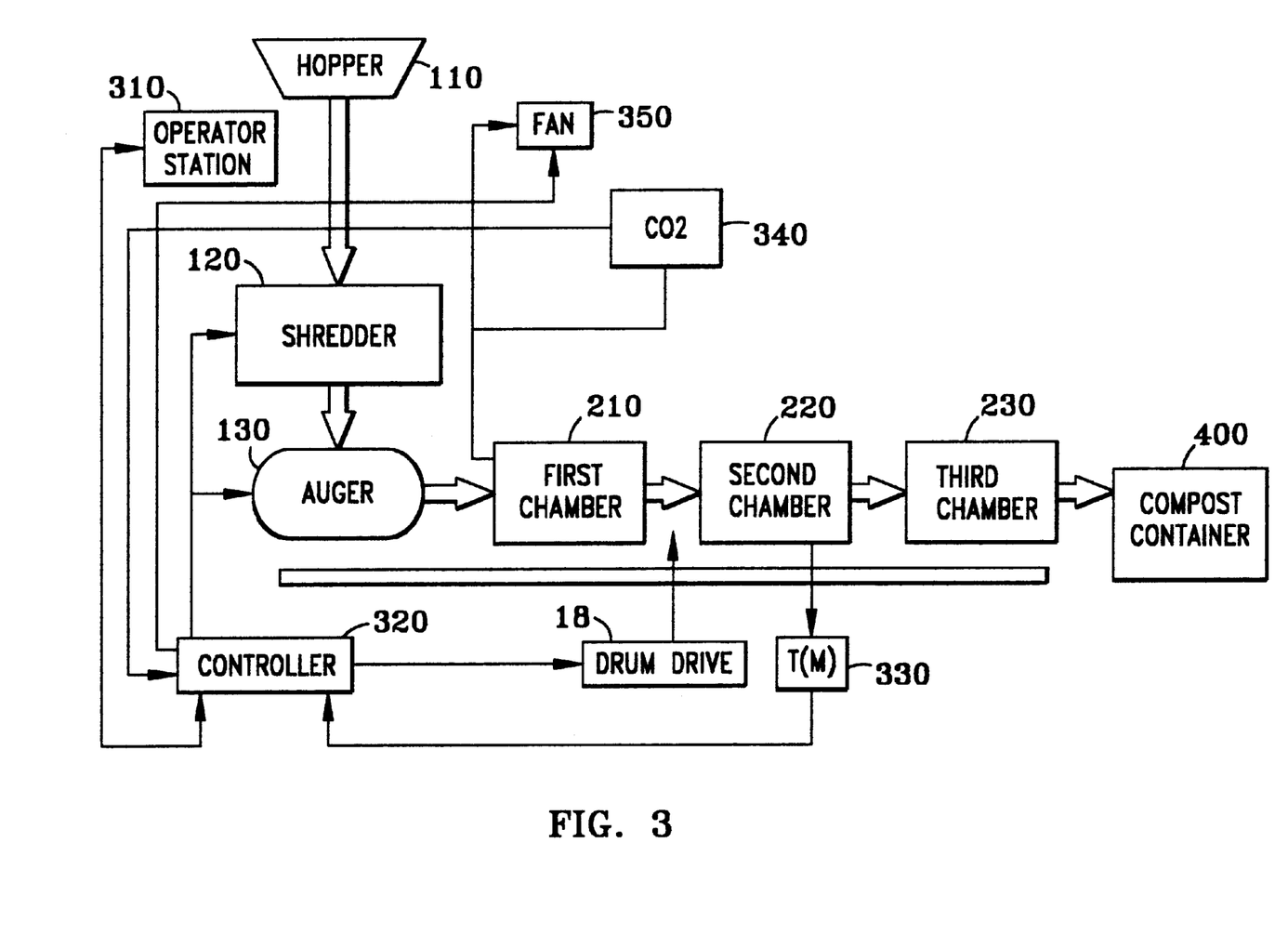
FIG. 3 is a block diagram illustrating the principal elements and the process flow of the preferred embodiment.
Figure 5:
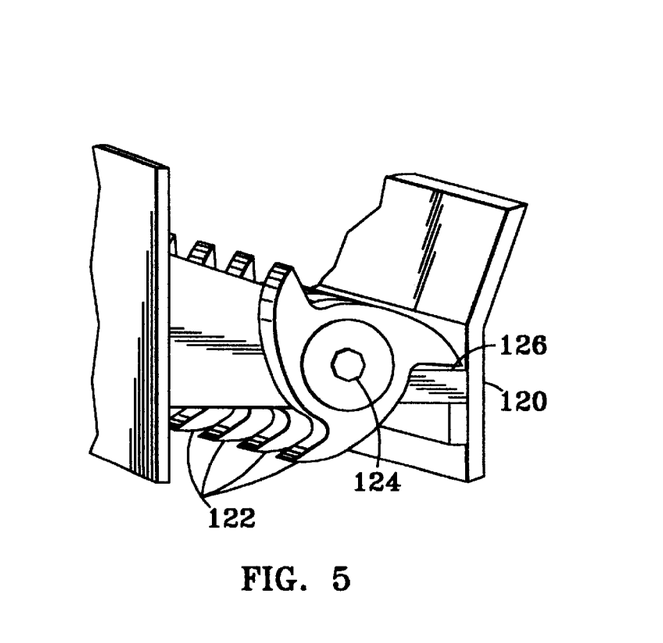
FIG. 5 is a partial perspective view of the shredder of the preferred embodiment, with its shaft-mounted rotating cutter blades.
Figure 6:
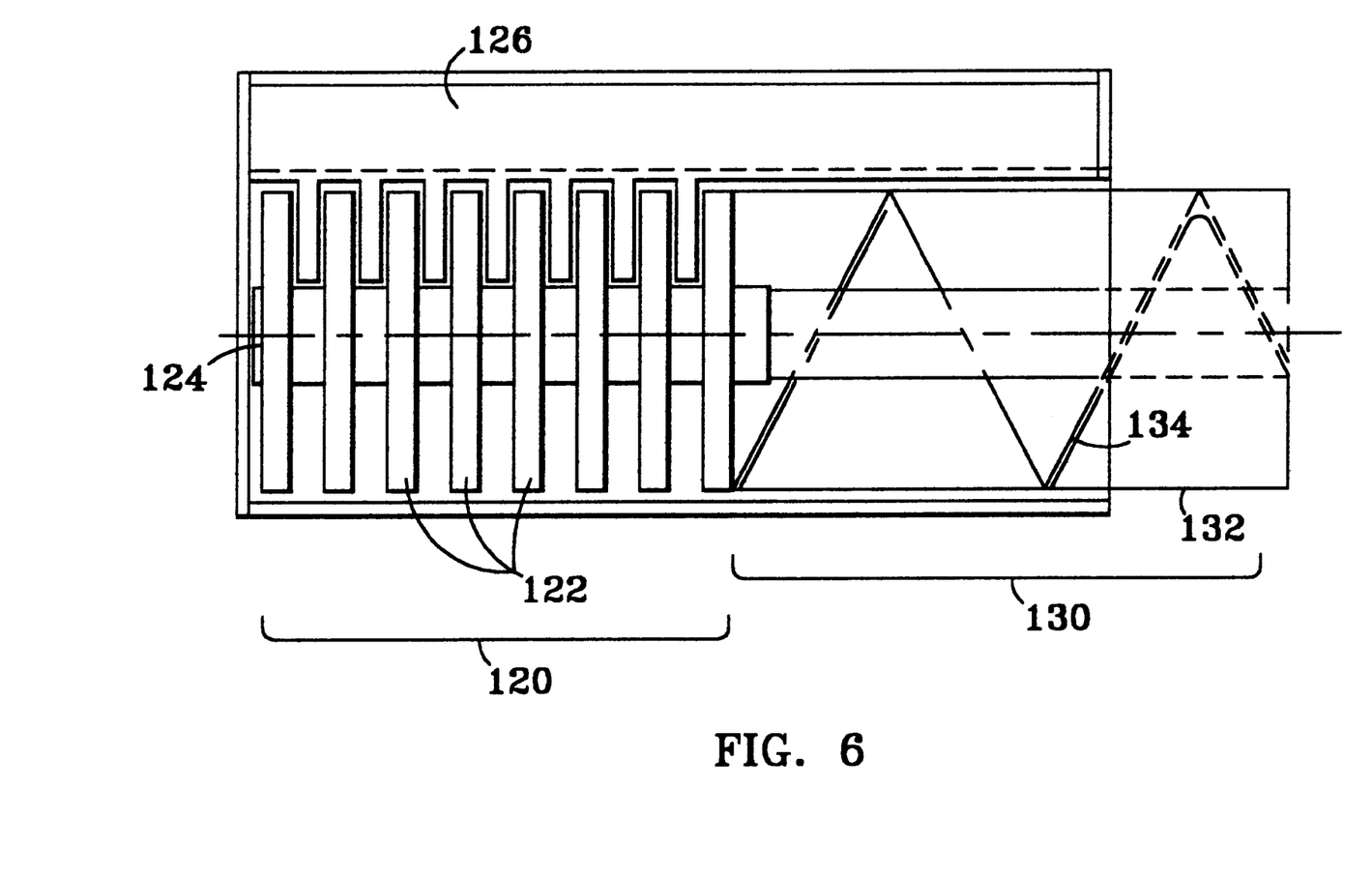
FIG. 6 is a partial cut-away top view of the shredder and auger sections, showing part of the rotating cutter blades and interspersed teeth of the stationary striking plate, and beneath it the vanes of the auger.

Referring to FIGS. 3, 5 and 6, Infeed section 100 has a feed hopper 110 about 40 inches by 20 inches and 30 inches deep, that is closed between feedings by hopper lid 112. The hopper feeds vertically downward into shredder 120. The shredder is a material shredder/particle sizer powered by an electric motor, consisting of a series of spaced apart multi-toothed blades 122 on a rotating shaft 124 that rotate past a toothed striking plate 126, and operates at 90 RPM. The tooth size, blade size and spacing is calculated to tear and shred the supplied materials into particles not larger than 1×1×3 inches. The shredder is capable of handling the raw food waste, including bones, as well as supplemental bulk materials such as cardboard.

Shredder 120 feeds vertically downward into auger 130, which is horizontally oriented and likewise powered by an electric motor. The nine inch by four foot chute 132 and vanes 134 of auger 130 deposit the shredded material into the drum section.

Figure 4:
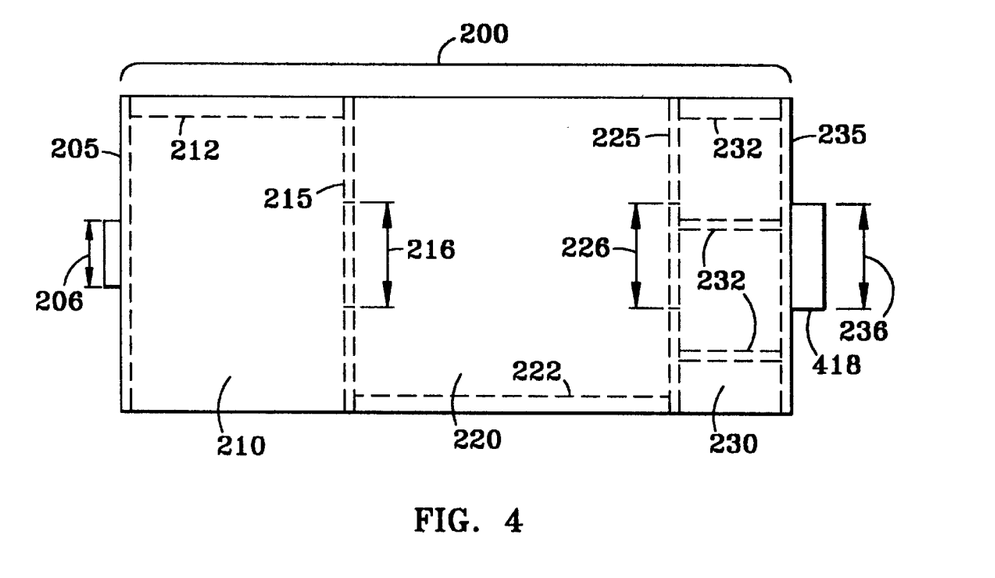
FIG. 4 is a side elevation cross section of the three chamber drum of the preferred embodiment.

Referring to FIG. 4, drum section 200 consists of a 4800 gallon, 7.5 foot diameter, 30 foot long drum 201, which has a front end 205 and back end 235, with interior partitions 215 and 225 segregating the interior volume into three chambers, 210, 220, and 230 respectively. Chambers 210 and 220 each have single horizontal vanes 212 and 222 respectively, of about four inches height running the length of their respective chambers, attached perpendicular to the drum wall and to the end walls of the chambers. Chamber 230 has three, radially spaced vanes 232, similar to vanes 212 and 222.

The first chamber, 210, holds about 8 cubic yards of working volume of materials in process, retaining about 6 yards if input slows or ceases, and has a throughput cycle of about two to six days. The second chamber, 220, has a capacity of about 11 cubic yards, retaining about 8 ½ yards if input slows or ceases, and has a throughput cycle of about four to 10 days. The third chamber, 230, holds about 4 ¾ cubic yards, retaining about 3 ¾ yards if inflow slows or ceases. The external catch box, compost container 400, has a 5 ½ yard capacity.

Drum 201 is preferrably fabricated of stainless steel, however, it could be made of any other suitable material. Drum 201 is mounted horizontally on the base frame 10 so as to be rotable on drum supports 14 and drum support rollers 16 by motorized drum drive system 18 consisting of a motor and gearbox coupled to a dual chain assembly. Drive system 18 incorporates an automatic brake feature to prevent roll back of the drum after rotation, due to the displacement of the contents in the direction of rotation.

Interior partitions 215 and 225 of drum 201 are substantially planar, and perpendicular to the axis of the drum. Drum front end 205 has a relatively small axial port 206 of about 12 inches diameter, through which auger 130 deposits the shredded materials. Partions 215 and 225 have relatively larger axial ports 216 and 226 of 14 and 16 inches diameter, respectively. Drum back end 235 has an axial port 236 of 18 inches diameter.

Referring to FIG. 3, the complete process path through the apparatus is into hopper 110, through shredder 120, via auger 130 through port 206 into chamber 210, and successively through chambers 220, 230, as moved by drum rotation and the gradual down slope flow through successively larger ports, through port 236 into compost container 400, from which the finished compost is periodically removed.

Again referring to FIG. 3, process control system 300 consists of operator's station 310, process controller 320 and process sensors including temperature sensor 330, an optional $CO_2$ sensor 340, and a biofilter equipped exhaust fan 350. The controller also receives inputs from an operator switch at operator's station 310, and various safety switches on the apparatus. The controller output controls shredder 120, auger 130, drum drive system 18, and exhaust fan 350. The duct for exhaust 350 is connected at the front end of the system so as to exhaust interior air and draw makeup air in from the vents at coupling 410 at the back end of the apparatus. Operator's station 310 is provided with temperature level readout and optional carbon dioxide level readout.

Temperature sensor 330 is located at the base of the drum in the area of the center chamber. The sensor assembly alternately bears on the exterior wall of center chamber 220 when the drum is not rotating, and is lifted clear by a cam when the drum is rotating. Sensor 330 contacts the drum at a point rotationally forward of bottom dead center where the center of mass of contained material is concentrated by the rotating action of the drum.

An alternative temperature sensing arrangement is provided by installing sensors in the second chamber at indexed stopping points where one will always be embedded in the material in process when the rotation stops. A connection is made through the drum wall between the sensor and an external, coincident pickup point, connecting to the controller.

As will be realized, the invention is capable of other and different embodiments, and its several details are capable of modifications in various obvious respects, all without departing from the essence of the invention. For instance, the invention can be scaled, so long as the critical parameters of the process are satisfied. A small version of the embodiment would be practical for a home owner, an intermediate version is practical for use by a restaurant or supermarket, and a large version would be practical for a municipal collection/drop-off facility.

As an example, there is within the scope of the invention, an apparatus for in-vessel composting of input materials consisting of food waste and associated organic packaging materials into nutrient-rich composting material consisting of a means for shredding the input materials into particle sizes of not larger than four cubic inches, preferably not larger than three inches.

There is a horizontal drum with an input end having an axial input port and a discharge end having a relatively larger axial discharge port. The drum is divided in length by interior partitions into first, second and third chambers. Each partition has an axial port by which the adjacent chambers are connected, and the axial ports are of sequentially larger diameter going from the input port to the discharge port. The second or middle chamber is significantly longer than the first and third chambers, and the diameter of the relatively larger discharge port is less than one half of the diameter of the drum.

There is an insulated enclosure within which the drum is contained, and a mechanism for passing the input materials through the shredding mechanism and into the first chamber. There is a vent or other opening for permitting low pressure outgassing from the drum as the process is working. There is a temperature sensor or transducer of some sort in the second chamber, preferably arranged to measure the temperature of the material in process. There is provision for rotating the drum in increments of less than one rotation about its axis, said means for rotating being initiated when said temperature in said second chamber is greater than about 150 degrees Fahrenheit, and there is a fan for exchanging air in the drum for outside air. Finally there is an operator station, and a controller that is connected for sensing or control inputs to at least the temperature sensors, to the drum rotating mechanism, to the fan, and to the operation said means for rotating said drum, said means for exchanging air, and the operator station.

As other examples, there may be included a multi-toothed rotary shredding mechanism configured to produce shreds about one inch by one inch by three inches in size. The first and second chambers may have structure for tumbling materials in process without contributing to forward advancement of the materials in process towards the discharge end. The structure may be a singular elongate blade attached to the drum wall within each chamber and oriented parallel to the axis of the drum.

As yet more examples, there may be included an input hopper connecting to the shredder mechanism, and an auger and chute assembly connecting from there to the axial input port of the drum. The hopper may have a lid and a lid position sensor, with the lid position sensor communicating with the controller. There may be a compost container connected to the discharge port. There may be a vent in or near the discharge end for permitting low pressure outgassing from the drum.

As further examples, there may be included a temperature sensor assembly external to the drum, configured to bear on the outer wall of the drum at a point rotationally forward of bottom dead center when the drum is not rotating and to rise away from the drum when the drum is rotating. In addition, or alternatively, there may be a temperature sensor assembly installed within the second chamber and communicating to a pickup device external of the drum, and hence to the controller. There may be a base frame with drum supports and drum support rollers upon which the drum rests, and a motorized drum drive system consisting of a motor and gearbox attached to the base frame and coupled to the drum.

As still more examples, there may be included an exhaust fan and duct, with duct connecting to said drum in the vicinity of said input end. There may be a carbon dioxide or oxygen sensor located in the proximity of the input end, preferably in the air stream to the exhaust fan, and communicating with the controller. The operator station may include a temperature indicator, a switch for engaging said means for shredding, and a switch for engaging said means for rotating.

Other variations within the scope of the invention will be apparent to those skilled in the art.

What is claimed is:

1. An apparatus for in-vessel composting of input materials consisting of food waste and associated organic packaging materials into nutrient-rich composting material comprising, means for shredding said input materials, said means configured and powered for rendering said input materials into particle sizes of not larger than four cubic inches, a horizontal drum with an input end having an axial input port and a discharge end having a relatively larger axial discharge port, said drum divided in length by interior partitions into first, second and third chambers, each said partition having an axial port by which adjacent said chambers are connected, said axial ports being of sequentially larger diameter from said input port to said relatively larger discharge port, said second chamber being significantly longer than said first and third chambers, the diameter of said relatively larger discharge port being less than one half of the diameter of said drum, an insulated enclosure within which said drum is contained, means for passing said input materials through said means for shredding and into said first chamber, means for permitting low pressure outgassing from said drum, means for measuring temperature in said second chamber, means for rotating said drum in increments of less than one rotation about its axis, said means for rotating being initiated when said temperature in said second chamber is greater than about 150 degrees Fahrenheit, means for exchanging air in said drum for outside air, an operator station, and a controller, said controller communicating with said means for measuring temperature, said means for rotating said drum, said means for exchanging air, and said operator station.

2. An apparatus for in-vessel composting of input materials according to claim 1, said means for shredding comprising a multi-toothed rotary shredding mechanism configured to produce shreds about one inch by one inch by three inches in size.

3. An apparatus for in-vessel composting of input materials according to claim 1, said first and second chambers each further comprising means for tumbling materials in process without contributing to forward advancement of said materials in process towards said discharge end.

4. An apparatus for in-vessel composting of input materials according to claim 3, said means for tumbling comprising a singular elongate blade attached to the drum wall within each said chamber and oriented parallel to said axis of said drum.

5. An apparatus for in-vessel composting of input materials according to claim 1, said means for passing said input materials through said means for shredding and into said first chamber comprising an input hopper connecting to said means for shredding and an auger and chute assembly connecting said means for shredding to said axial input port of said input end of said drum.

6. An apparatus for in-vessel composting of input materials according to claim 5, said input hopper having a lid and a lid position sensor, said lid position sensor communicating with said controller.

7. An apparatus for in-vessel composting of input materials according to claim 1, further comprising a compost container connecting to said discharge port.

8. An apparatus for in-vessel composting of input materials according to claim 1, said means for permitting low pressure outgassing from said drum comprising a vent located in the vicinity of the discharge end.

9. An apparatus for in-vessel composting of input materials according to claim 1, said means for measuring temperature in said second chamber comprising a temperature sensor assembly external to said drum configured to bear on the outer wall of said drum at a point rotationally forward of bottom dead center when said drum is not rotating and to rise away from said drum when said drum is rotating.

10. An apparatus for in-vessel composting of input materials according to claim 1, said means for measuring temperature in said second chamber comprising a temperature sensor assembly installed within said second chamber and communicating to a pickup device external of said drum.

11. An apparatus for in-vessel composting of input materials according to claim 1, said means for rotating said drum comprising a base frame with drum supports and drum support rollers upon which said drum rests, and a motorized drum drive system comprising a motor and gearbox attached to said base frame and coupled to said drum.

12. An apparatus for in-vessel composting of input materials according to claim 1, said means for exchanging air in said drum for outside air comprising an exhaust fan and duct, said duct connecting to said drum in the vicinity of said input end.

13. An apparatus for in-vessel composting of input materials according to claim 1, further comprising a carbon dioxide sensor located in the proximity of said input end and communicating with said controller.

14. An apparatus for in-vessel composting of input materials according to claim 1, said operator station comprising a temperature indicator, a switch for engaging said means for shredding, and a switch for engaging said means for rotating.

15. An apparatus for in-vessel composting of input materials consisting of food waste and associated organic packaging materials into nutrient-rich composting material comprising, a multi-toothed rotary shredder configured for rendering said input materials into particle sizes of about one inch by one inch by three inches in size, a horizontal drum with an input end having an axial input port and a discharge end having a relatively larger axial discharge port, said drum divided in length by interior partitions into first, second and third chambers, each said partition having an axial port by which adjacent said chambers are connected, said axial ports being of sequentially larger diameter from said input port to said relatively larger discharge port, said second chamber being significantly longer than said first and third chambers, the diameter of said relatively larger discharge port being less than one half of the diameter of said discharge end, an insulated enclosure within which said drum is contained, an input hopper vertically connecting to said shredder, an auger and chute assembly interspersed between said shredder and said axial input port of said input end of said drum, means for permitting low pressure outgassing from said drum, means for measuring temperature in said second chamber, means for rotating said drum in increments of less than one rotation about its axis, said means for rotating comprising a base frame with drum supports and drum support rollers upon which said drum rests, and a motorized drum drive system comprising a motor and gearbox attached to said base frame and coupled to said drum, said means for rotating being initiated when said temperature in said second chamber is greater than about 150 degrees Fahrenheit, an exhaust fan mounted in a duct, said duct connecting to said drum in the vicinity of said input end, an operator station, and a controller, said controller communicating with said means for measuring temperature, said means for rotating said drum, said exhaust fan, and said operator station.

16. An apparatus for in-vessel composting of input materials according to claim 15, said first and second chambers each further comprising structure for tumbling materials in process during rotation without contributing to forward advancement of said materials in process towards said discharge end.

17. An apparatus for in-vessel composting of input materials according to claim 15, said input hopper having a lid and a lid position sensor, said lid position sensor communicating with said controller.

18. An apparatus for in-vessel composting of input materials according to claim 15, said means for measuring temperature in said second chamber comprising a temperature sensor assembly external to said drum configured to bear on the outer wall of said drum at a point rotationally forward of bottom dead center when said drum is not rotating and further configured to rise away from said drum when said drum is rotating.

19. An apparatus for in-vessel composting of input materials according to claim 15, said means for measuring temperature in said second chamber comprising a temperature sensor assembly installed within said second chamber and communicating to a pickup device external of said drum.

20. An apparatus for in-vessel composting of input materials according to claim 15, said operator station comprising a temperature indicator, a switch for engaging said means for shredding, and a switch for engaging said means for rotating.

* * * * *

UNITED STATES PATENT AND TRADEMARK OFFICE
CERTIFICATE OF CORRECTION

PATENT NO. : 6,071,740
DATED : June 6, 2000
INVENTOR(S) : Kerouac

It is certified that error appears in the above-identified patent and that said Letters Patent is hereby corrected as shown below:

Col. 2: line 22, delete "exygen", insert --oxygen--.
Col. 3: line 5, delete "shreder", insert --shredder--.
Col. 3: line 53, delete "be", insert --been--.
Col. 3: line 54, delete "filly", insert --fully--.
Col. 4: line 40, delete "foot", insert --food--.
Col. 5: line 38, delete "moter", insert --motor--.
Col. 6: line 32, delete "effecient", insert --efficient--.
Col. 7: line 33, delete "effecient", insert --efficient--.

Signed and Sealed this

Twenty-second Day of May, 2001

*Attest:*

NICHOLAS P. GODICI

*Attesting Officer*    *Acting Director of the United States Patent and Trademark Office*